US008854334B2

(12) United States Patent
Shih et al.

(10) Patent No.: US 8,854,334 B2
(45) Date of Patent: Oct. 7, 2014

(54) TOUCH PANEL AND TOUCH DISPLAY DEVICE USING THE SAME

(75) Inventors: Po-Sheng Shih, Miao-Li County (TW); Shing-Shiang Chang, Miao-Li County (TW); Jia-Shyong Cheng, Miao-Li County (TW)

(73) Assignee: Innolux Corporation, Miao-Li County (TW)

( * ) Notice: Subject to any disclaimer, the term of this patent is extended or adjusted under 35 U.S.C. 154(b) by 563 days.

(21) Appl. No.: 12/907,038

(22) Filed: Oct. 19, 2010

(65) Prior Publication Data

US 2011/0096023 A1 Apr. 28, 2011

(30) Foreign Application Priority Data

Oct. 22, 2009 (CN) .......................... 2009 1 0308643

(51) Int. Cl.
*G06F 3/045* (2006.01)
*G06F 3/041* (2006.01)
*G06F 3/044* (2006.01)

(52) U.S. Cl.
CPC .............. *G06F 3/0412* (2013.01); *G06F 3/044* (2013.01); *G06F 3/0418* (2013.01)
USPC .......................................... 345/174; 345/173

(58) Field of Classification Search
None
See application file for complete search history.

(56) References Cited

U.S. PATENT DOCUMENTS

| 2006/0119590 A1* | 6/2006 | Park et al. ..................... 345/175 |
| 2007/0236424 A1* | 10/2007 | Kimura ............................ 345/76 |
| 2010/0078230 A1* | 4/2010 | Rosenblatt et al. ......... 178/18.01 |
| 2010/0194699 A1* | 8/2010 | Chang ............................. 345/173 |

FOREIGN PATENT DOCUMENTS

CN 101178524 A 5/2008

* cited by examiner

*Primary Examiner* — Joe H Cheng
*Assistant Examiner* — Yaron Cohen
(74) *Attorney, Agent, or Firm* — Li & Cai Intellectual Property (USA) Office

(57) ABSTRACT

An exemplary embodiment of touch display device includes a touch panel and a signal processing circuit. The touch panel includes a plurality of touch sensing units, and each touch sensing unit includes a touch sensing element and a coupling sensing element. The signal processing circuit is electrically connected to the touch sensing element and the coupling sensing element. The touch sensing element provides a touch signal to the signal processing circuit, the coupling sensing element provides a coupling signal to the signal processing circuit, and the signal processing circuit processes the touch signal according to the coupling signal to filter an interference signal of the touch signal. A touch display device using the touch panel is also described.

19 Claims, 5 Drawing Sheets

TOUCH PANEL AND TOUCH DISPLAY DEVICE USING THE SAME

BACKGROUND

1. Technical Field

The disclosure generally relates to touch panels and touch display devices, and particularly relates, to a touch display device having a in-cell touch panel.

2. Description of the Related Art

Touch display devices are widely used in the electronic devices, such as mobile phones, game consoles, personal digital assistants (PDAs), for instance. Generally speaking, the touch display devices can be divided into two kinds: external touch display devices and in-cell touch display devices. Among them, the in-cell touch display devices are generally used due to the smaller overall thickness, simpler manufacturing processes, and the lower manufacturing costs.

The in-cell touch display device is the integration of the touch panel and liquid crystal display (LCD) panel, so a user can operate the touch display device by touching the touch panel. However, in the existing in-cell display devices, different touch sensing components are directly built in the LCD panel, so that the sensing signals provided by the touch sensing elements are susceptible to interference because of various internal parasitic elements (e.g., parasitic capacitance) of the LCD panel as well as external environmental temperature and other factors. For these reasons, the touch panel can not accurately determine the touch positions of the user, causing the touch display device working abnormally. Thus, the existing in-cell touch display devices have low stability and reliability.

Therefore, there is room for improvement within the art.

SUMMARY OF THE INVENTION

According to one aspect of the present disclosure, there is provided an exemplary embodiment of a touch panel. The touch panel includes a plurality of touch sensing units, and each touch sensing unit includes a plurality of pixel units, a touch sensing element and a coupling sensing element. The touch sensing element positioned in a corresponding pixel unit provides a touch signal to the signal processing circuit when the touch sensing unit is operated. The coupling sensing element positioned in a corresponding pixel unit provides a coupling signal to the signal processing circuit, and the signal processing circuit processes the touch signal according to the coupling signal to filter an interference signal of the touch signal.

According to another aspect of the present disclosure, there is provided an exemplary embodiment of touch display device includes a touch panel and a signal processing circuit. The touch panel includes a plurality of touch sensing units, and each touch sensing unit includes a touch sensing element and a coupling sensing element. The signal processing circuit is electrically connected to the touch sensing element and the coupling sensing element. The touch sensing element provides a touch signal to the signal processing circuit, the coupling sensing element provides a coupling signal to the signal processing circuit, and the signal processing circuit processes the touch signal according to the coupling signal to filter an interference signal of the touch signal.

According to the other aspect of the present disclosure, there is provided an exemplary embodiment of touch display device includes a touch panel and a signal processing circuit. The touch panel includes a first base board comprising a common electrode layer, a second base board, a plurality of touch sensing units. Each touch sensing unit includes a touch sensing element providing a touch signal and a coupling sensing element providing a coupling signal. The touch sensing element comprising a switch element positioned on the second base board and a protrusion positioned on the first base board and covered by the common electrode layer, and the protrusion operated to make the common electrode layer contact with the second base board to switch on the switch unit to output the touch signal. The coupling sensing element comprising a switch unit positioned on the second base board, the common electrode layer failing to directly touch the switch unit when the coupling sensing element operated. The signal processing circuit is electrically connected to the touch sensing element and the coupling sensing element, wherein the signal processing circuit receives the touch signal and the coupling signal and processes the touch signal according to the coupling signal to filer an interference signal of the touch signal.

BRIEF DESCRIPTION OF THE DRAWINGS

Many aspects of a touch panel and a touch display device using the same can be better understood with reference to the following drawings. The components in the drawings are not necessarily drawn to scale, the emphasis instead being placed upon clearly illustrating the principles of the exemplary touch panel and touch display device using the same. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
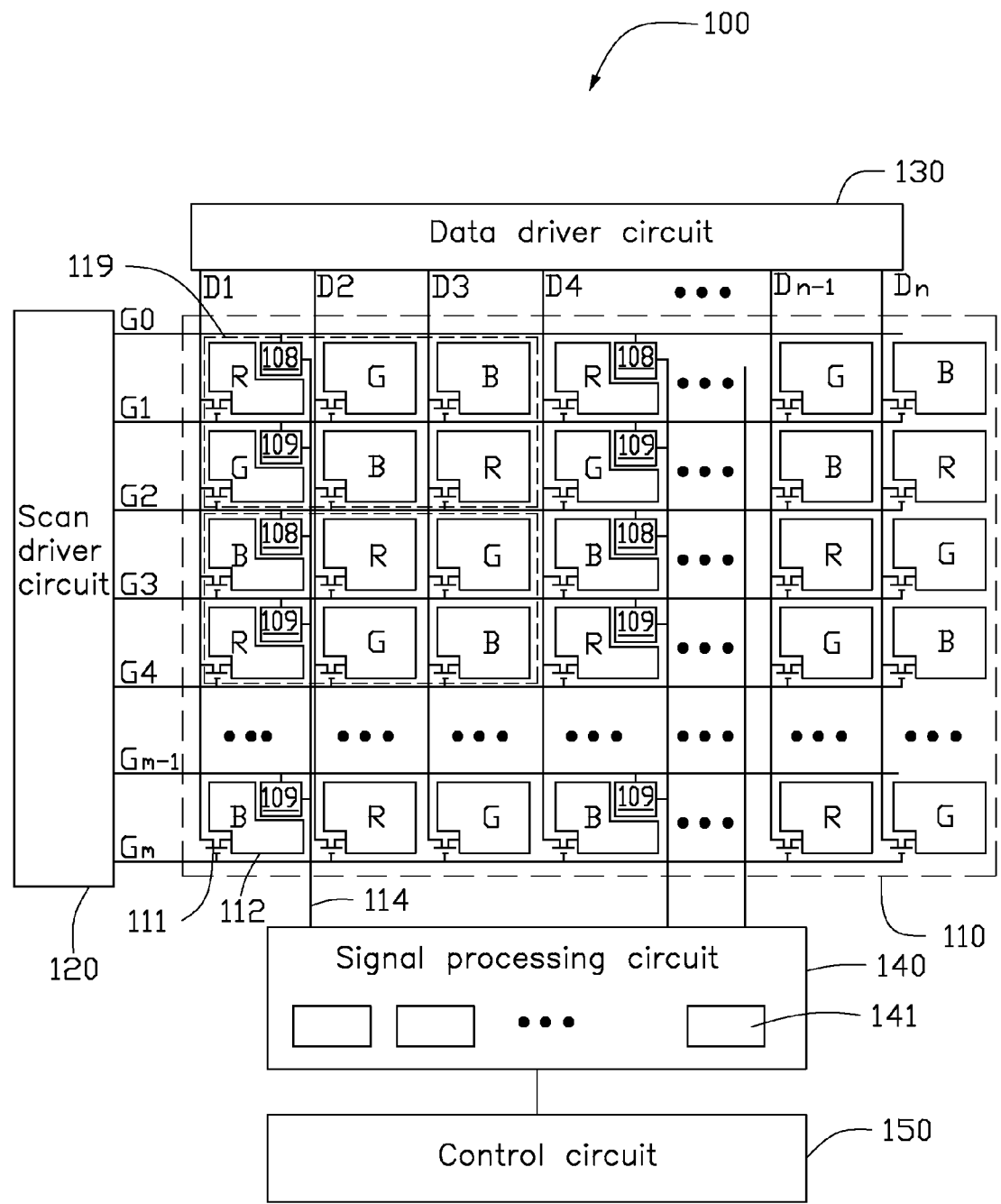
FIG. 1 is a schematic view of a touch display device, according to an exemplary embodiment.

FIG. 1 shows an exemplary embodiment of a touch display device 100, which is a in-cell touch display device. The touch display device 100 includes a touch panel 110, a scan driver circuit 120, a data driver circuit 130, a signal processing circuit 140, and a control circuit 150.

The touch panel 110 can be a liquid crystal display (LCD) panel and includes a total m+1 parallel scan lines G0~Gm, a total n parallel data lines D1~Dn, and a total m×n matrix distribution pixel units Pij (where i, j respectively represent the i-th row and the j-th column of the matrix, and $1 \leq i \leq m$, $1 \leq j \leq n$). The scan lines G0~Gm are perpendicular to the data lines D1~Dn, and each pixel unit Pij is formed by intersection of a scan line Gi and a data line Dj, such that the scan lines G0~Gm intersect to the data lines D1~Dn to form the matrix-shaped pixel units Pij.

Each pixel unit Pij includes a thin film transistor 111 and a pixel electrode 112. The gate of the thin film transistor 111 is electrically connected to the scan driver circuit 120 through corresponding scan line Gi ($1 \leq i \leq m$), the source of the thin film transistor 111 is electrically connected to the data driver circuit 130 through corresponding data line Dj (1≤j≤n), and the drain of the thin film transistor 111 is electrically connected to the pixel electrode 112. The touch panel 110 further includes a common electrode layer (not shown), the common electrode layer includes a plurality of common electrodes, and each common electrode respectively corresponds to a pixel unit. In each pixel unit, the pixel electrode 112, the common electrode, and a liquid crystal layer located between the pixel electrode 112 and the common electrode constitute a liquid crystal capacitor.

The total of m×n pixel units can be divided into a plurality of touch sensing units 119 in the touch panel 110. Referring to FIG. 1, in this embodiment, a total p×q pixel units constitute a touch sensing unit 119, where p=3, q=2, and each touch sensing unit 119 respectively including 3×2 pixel units. In detail, the 3×2 pixel units can be divided into a first sensing module and a second sensing module adjacent to the first sensing module, and each sensing module includes 3×1 pixel units which respectively correspond to the red pixel unit, the green pixel unit, and the blue pixel unit.

The first sensing module is used to provide a touch signal to the signal processing circuit 140 when the touch display device 100 is touched, and the second sensing module is used to provide a coupling signal to the signal processing circuit 140. Similarly, p and q can also be set to other values, and the structure of the touch display panel 110 is adjusted accordingly.

For example, the first sensing module and the second sensing module are respectively located in the i-th row and the i+1-th row. Each touch sensing unit 119 includes a touch sensing element 108 and a coupling sensing element 109, and the touch sensing element 108 and the coupling sensing element 109 are respectively positioned in the first sensing module and the second sensing module. The touch sensing element 108 is connected to the i–1-th scan line Gi–1, the coupling sensing element 109 is connected to the i-th scan line Gi, and the touch sensing element 108 and the coupling sensing element 109 are electrically connected to the signal processing circuit 140 via the same one touch sensing line 114.

Figure 2:
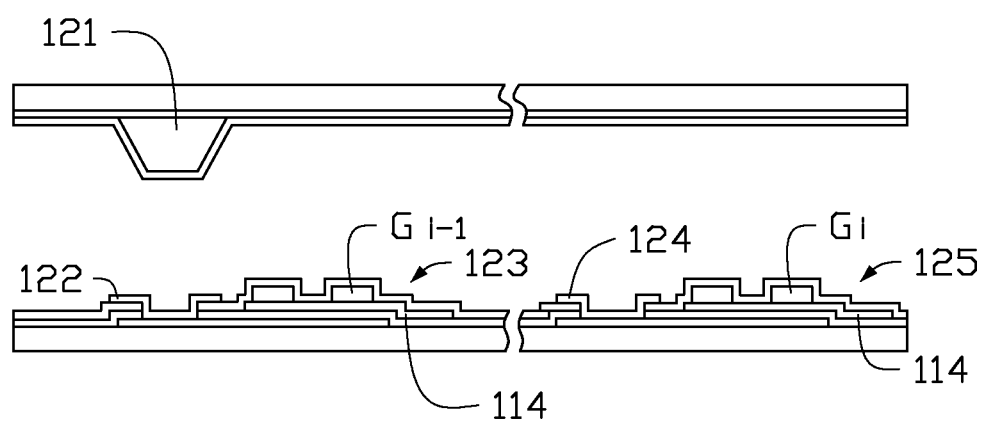
FIG. 2 is a partially side schematic view of a touch display unit in a touch display panel of the touch display device of FIG. 1.

Further referring to FIG. 2, the touch sensing element 108 includes a protrusion 121, a touch electrode 122, and a switch element 123. The protrusion 121 is positioned between a color filter substrate and the common electrode layer; the touch electrode 122 is positioned on the thin film transistor substrate and corresponds to the protrusion 121. The switch element 123 includes a control end, when the touch sensing unit 119 is touched, the switch element 123 is switched on controlled by the control end, or the switch element 123 is switched off controlled by the control end.

In this embodiment, the switch element 123 can be a thin film transistor module. In detail, the gate of the switch element 123 is set as a control end and electrically connected to the touch electrode 122, the source of the switch element 123 is electrically connected to the scan line Gi–1, and the drain of the switch element 123 is electrically connected to the touch sensing line 114. When the touch sensing element 108 of the touch sensing unit 119 is operated by the user, the protrusion 121 forces the common electrode layer covered on the protrusion 121 to contact the touch electrode 122 in the external force, such that the voltage of the common electrode layer is applied to the gate of the switch element 123, causing the switch element 123 to be switched on. Thus, the source of the switch element 123 receives scan signals from the scan line Gi–1, and the scan signals used as touch signals is sent to the signal processing circuit 140.

The coupling sensing element 109 and the touch sensing element 108 have the similar structure. In particular, the coupling sensing element 109 includes an electrode 124 and a switch unit 125. The switch unit 125 can be a thin film transistor, and the gate, the source, and the drain of the switch unit 125 are respectively connected to the electrode 124, the scan line Gi, and the touch sensing line 114. When the coupling sensing element 109 of the touch sensing unit 119 is touched by the user, the common electrode layer can not touch and connect the electrode 124, such that the switch unit 125 may be switched off.

Figure 3:
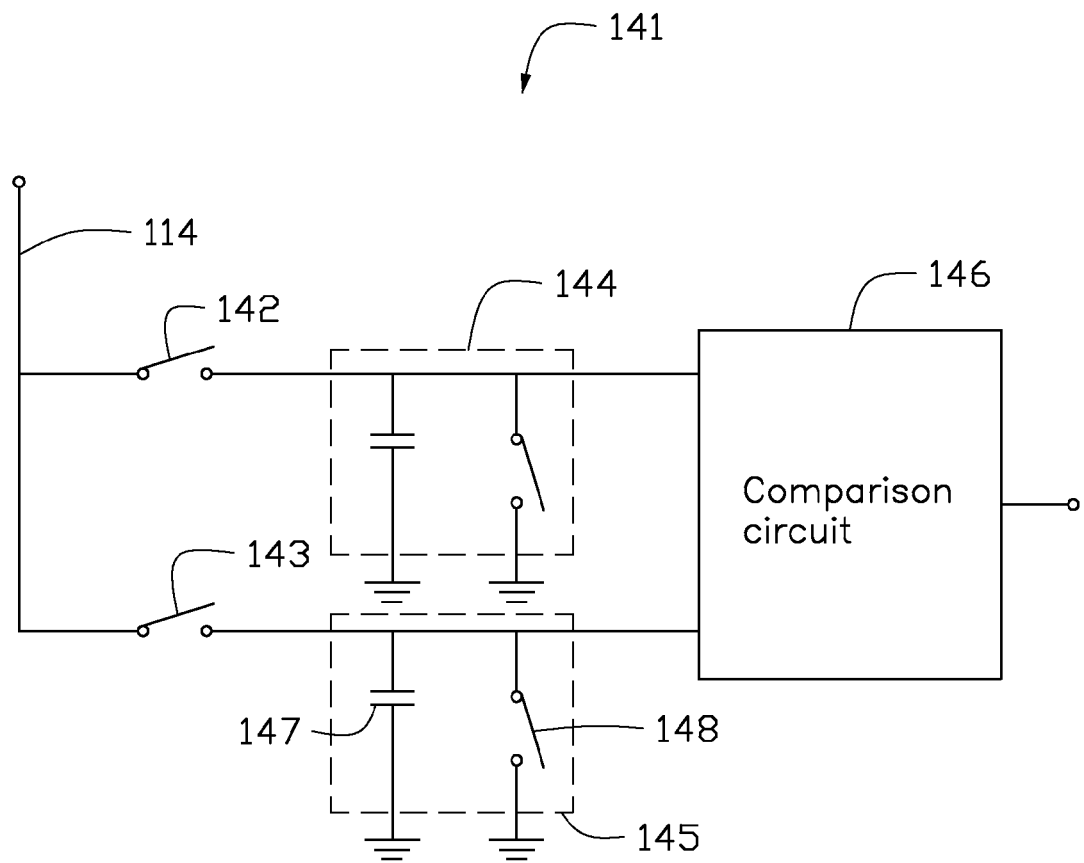
FIG. 3 is a circuit schematic view of a signal processing unit in a signal processing circuit of the touch display device shown in FIG. 1.

Also referring to FIG. 3, the signal processing circuit 140 includes a plurality of signal processing units 141 corresponding to a column of touch sensing units 119. Each signal processing unit 141 is electrically connected to the corresponding touch sensing units 119 via the touch sensing line 114 to receive corresponding sending signals. In detail, each signal processing unit 141 includes a first switch module 142, a second switch module 143, a first signal storage unit 144, a second signal storage unit 145, and a comparison circuit 146.

One end of the first switch module 142 is connected to the touch sensing line 114, another end of the first switch module 142 is connected to the signal storage unit 144. One end of the second switch 143 is connected to between the touch sensing line 114 and the first switch module 142, another end of the second switch module 143 is connected to the second signal storage unit 145. The first signal storage unit 144 and the second signal storage unit 145 are electrically connected to the comparison circuit 146. The first switch module 142 and the second switch module 143 are alternately switched on under the control of the timing sequence/pulse signals, thus, either the first switch module 142 or the second switch module 143 may be switched on at the same time. In detail, the comparison circuit 146 can be a differential amplifier, which includes an in-phase input end, an inverting input end, and an output end. The first signal storage unit 144 and the second signal storage unit 145 are respectively connected to the in-phase input end and the inverting input end. The output end is electrically connected to the control circuit 150. The first signal storage unit 144 and the second signal storage unit 145 may have the same structure, both of which respectively includes a storage capacitor 147 and a switch 148 connected with the storage capacitor 147 in parallel.

In use, the scan driver circuit 120 of the touch display device 100 provides corresponding scan signals to the scan lines G0~Gm. When the k-th scan line receives the scan signals from the scan driver circuit 120, the thin film transistor 111 in the k-th row pixel unit of the touch panel 110 is switched on. Thus, the data driver circuit 130 provides the data signals through the corresponding data lines D1~Dn and the thin film transistor 111 to all the k-th row pixel units, so that the touch panel 110 can display corresponding images.

When the touch display device 100 is operated by a user to perform a corresponding touch operation at a touch position, the touch sensing unit 119 senses the touch operation at the touch position, then the protrusion 121 of the touch sensing element 108 forces the common electrode layer contact the touch electrode 122, such that the voltage of the common electrode layer is applied to the gate of the switch element 123, causing the switch element 123 to be switched on.

When the scan line Gi–1 receives the scan signals from the scan driver circuit 120, the switch element 123 then sends the scan signals as touch signals to the corresponding signal processing unit 141 of the signal processing circuit 140 through the touch sensing lines 114. When the scan line Gi–1 receives the scan signals from the scan driver circuit 120, the first switch module 142 is switched on and the second switch module 143 is switched off due to the timing sequence/pulse signals control. Thus, the touch signals are sent and stored in the storage capacitor 147 of the first signal storage unit 144 through the first switch module 143. In practice, the touch signals received by the signal processing unit 141 may also be mixed with other interference signals due to coupling effect of the parasitic elements in the touch display device 100, the external temperature and other factors.

When the next scan line Gi receives the scan signals, the first switch module 142 is switched off, and the second switch module 143 is switched on due to the timing sequence/pulse signals control. Thus, the coupling sensing unit 109 provides a corresponding coupling signal to the signal processing unit 141, and the coupling signal is sent to the storage capacitor 147 of the second signal storage unit 145 through the second switch module 143 for storage. The comparison circuit 146 reads and compares the touch signals from the first signal storage unit 144 and coupling signals from and the second signal storage unit 145, and processes the touch signals according to the coupling signals in order to filter the interference signals from the touch signals.

The comparison circuit 146 can also be used to transmit the touch signals processed by the signal processing unit 141 to the control circuit 150, so that the control circuit 150 can determine the coordinates of the touch position. The control circuit 150 can further execute corresponding touch operations according to the coordinates of the touch position, and controls the touch display device 100 or electronic device using the touch display device 100 to perform corresponding actions.

The touch panel 110 of the touch display device 100 includes a plurality of touch sensing units 119, and the touch sensing element 108 and the coupling sensing element 109 have the similar structure and are configured in each touch sensing unit 119. The signal processing circuit 140 processed the touch signals from the touch sensing element 108 according to the coupling signals from the coupling element 109, such that the interference signals among the touch signals are filtered. Thus, according to the touch signals, the control circuit 150 can accurately determine the user's touch positions and operations to control the touch display device 100 to perform corresponding operations, thereby reducing the malfunction and increasing the stability and reliability of the touch display device 100 and related electronic devices.

Figure 4:
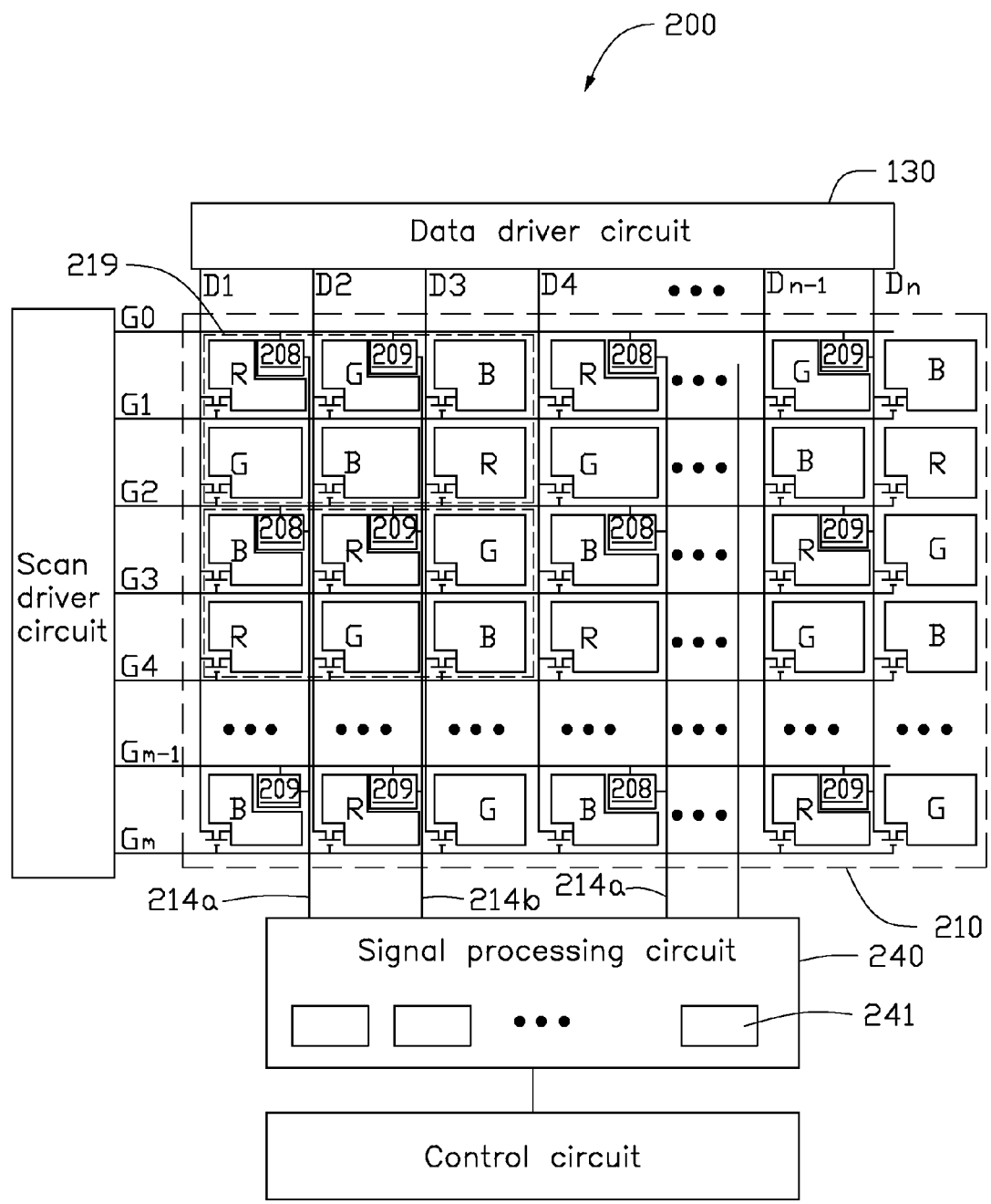
FIG. 4 is a schematic view of a touch display device, according to another exemplary embodiment.
Figure 5:
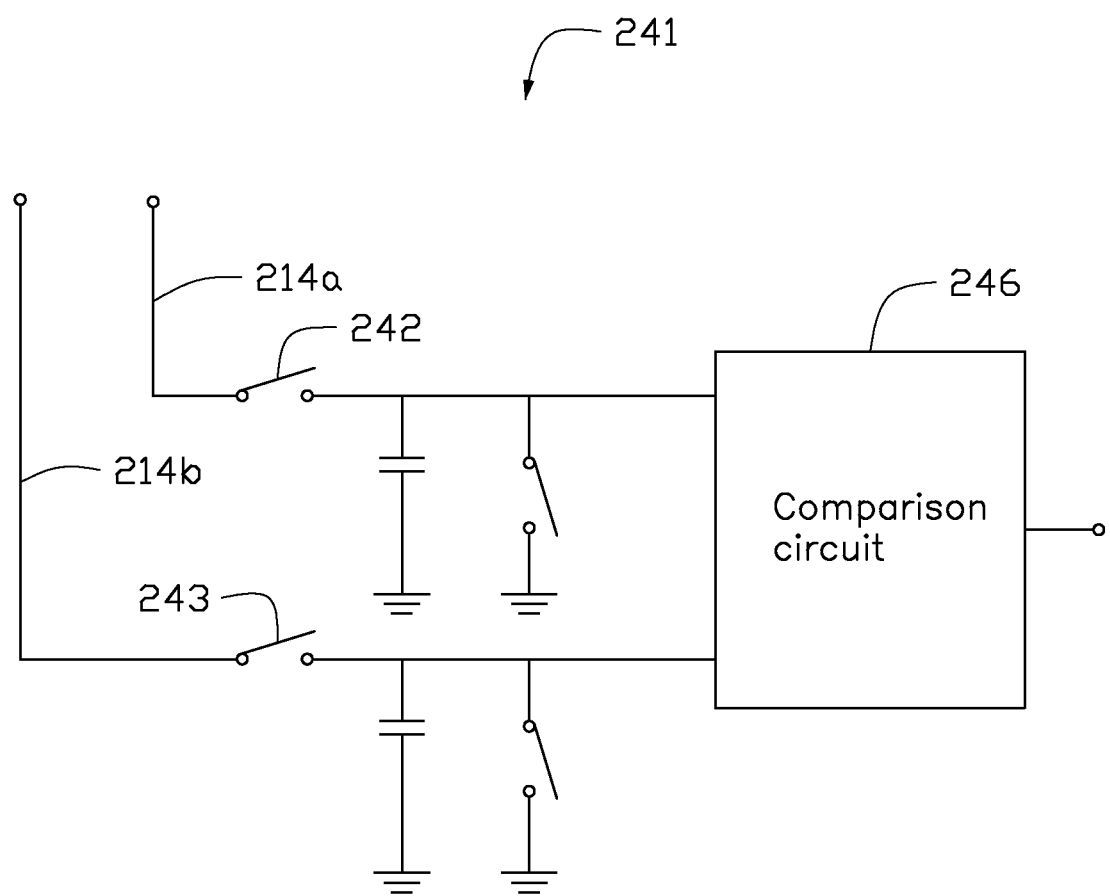
FIG. 5 is a circuit schematic view of a signal processing unit in a signal processing circuit of the touch display device shown in FIG. 4.

Further referring to FIGS. 4 and 5, another embodiment of touch display device 200 has difference from the previous touch display device 100 in the structure of the touch panel. In detail, the touch panel 210 of the touch display device 200 includes a plurality of touch sensing units 219, and each touch sensing unit 219 includes a touch sensing element 208 and a coupling sensing element 209. The touch sensing element 208 and the coupling sensing element 209 are respectively positioned in the pixel unit on the same row, and electrically connected to the same scan line Gi. The touch sensing element 208 electrically connected to the signal processing circuit 214 through a first touch sensing line 214a, and the first touch sensing line 214a is electrically connected to the comparison circuit 246 through the first switch module 242 of the signal processing 241. The coupling sensing element 209 is electrically connected to the signal processing circuit 214 through a second touch sensing line 214b, and the second touch sensing line 214b is also electrically connected to the comparison circuit 246 through the second switch module 243 of the signal processing unit 241.

In use, a user makes a touch action to the touch display device 200, when the scan line Gi receives the corresponding scan signals, the touch sensing element 208 and the coupling sensing element 209 respectively provide touch signals and coupling signals to the signal processing circuit 240 at the same time. Thus, the signal processing circuit 240 processes the touch signals according to the coupling signals to filter the interference signals among the touch signals, resulting from increasing the stability and reliability of the touch display device 200.

In summary, the touch sensing element 108 can not only be composed of the protrusion 121, the touch electrode 122, and the switch element 123, may also be a photosensitivity touch sensing element constituted by an optical thin film transistor. Moreover, when the switch elements 123 and 125 are top gate type thin film transistors, the touch sensing element 108 can not include the touch electrode 122, and the coupling sensing element 109 can not include the electrode 124. Thus, the protrusion 121 forces the common electrode layer to directly contact the gate of the switch element 123 under the external force.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A capacitive touch display device, comprising:
    a capacitive touch panel comprising a plurality of touch sensing units, a plurality of scan lines, a plurality of thin film transistors, a plurality of pixel electrodes and a color filter substrate, each touch sensing unit comprising a touch sensing element and a coupling sensing element due to coupling effect of parasitic elements, the touch sensing element and the coupling sensing element are directly connected to the corresponding scan lines, the gate of each thin film transistor is directly connected to the corresponding scan line, and the drain of each thin film transistor is directly connected to each pixel electrode, wherein the color filter substrate further comprises a common electrode layer, and the coupling sensing element comprises an electrode and a switch unit comprising a control end connected to the electrode, wherein the common electrode layer cannot directly touch and connect the electrode and the switch unit when the coupling sensing element is operated, and
    a signal processing circuit electrically connected to the touch sensing element and the coupling sensing element through at least one touch sensing line, wherein the touch sensing element provides a touch signal to the signal processing circuit, the coupling sensing element provides a coupling signal to the signal processing circuit, the touch signal comprises a scanning signal, a real-touch signal, and an interference signal, the coupling signal comprises a scanning signal and an interference signal, and the signal processing circuit eliminates the coupling signal from the touch signal to filter the interference signal of the touch signal.

2. The capacitive touch display device as claimed in claim 1, wherein the signal processing circuit comprises a plurality of signal processing units, each signal processing unit respectively corresponds to a column of touch sensing units and is connected to the touch sensing element and the coupling sensing element through at least one of corresponding signal sensing lines.

3. The capacitive touch display device as claimed in claim 2, wherein the signal processing circuit further comprises a comparison circuit, the comparison circuit comprises an in-phase input end and an inverting input end, wherein the in-phase input end receives the touch signal, and the inverting input end receives the coupling signal.

4. The capacitive touch display device as claimed in claim 3, wherein the signal processing unit further comprises a first switch module and a second switch module, one end of the first switch module is connected to the touch sensing element through the touch sensing line, one end of the second switch module is connected to the coupling sensing element through the touch sensing line.

5. The capacitive touch display device as claimed in claim 4, wherein the signal processing unit further comprises a first signal storage unit and a second signal storage unit, the first signal storage unit is connected to the in-phase input end of the comparison circuit and another end of the first switch module, the second signal storage unit is connected to the inverting input end of the comparison circuit and another end of the second switch module.

6. The capacitive touch display device as claimed in claim 5, wherein the first signal storage unit and the second signal storage unit respectively comprise a storage capacitor and a switch connected with the storage capacitor in parallel.

7. The capacitive touch display device as claimed in claim 1, wherein the touch sensing element comprises a touch electrode and a switch element, the switch element comprises a control end and is connected between the corresponding scan lines and the touch sensing lines, the touch electrode is connected to the control end of the switch element.

8. The capacitive touch display device as claimed in claim 7, wherein the capacitive touch panel further comprises a color filter substrate and a thin film transistor substrate, the touch sensing element further comprises a protrusion, the protrusion is positioned on the color filter substrate and is covered by the common electrode layer, the touch electrode and the switch element are positioned on the thin film transistor substrate and correspond to the protrusion.

9. The capacitive touch display device as claimed in claim 8, wherein the protrusion covered with the common electrode layer is operated to make the common electrode layer contact with the touch electrode, the switch element is switched on.

10. The capacitive touch display device as claimed in claim 1, wherein each touch sensing unit comprises a first sensing module and a second sensing module, the first sensing module and the second sensing module respectively comprises a red pixel unit, a green pixel unit, and a blue pixel unit, the touch sensing element is disposed in one of the red pixel unit, the green pixel unit and the blue pixel unit of the first sensing module, and the coupling sensing element is disposed in one the red pixel unit, the green pixel unit and the blue pixel unit of the second sensing module, the touch sensing element and the coupling sensing element are directly connected to adjacent scan lines and are electrically connected to the signal processing circuit through the same touch sensing line.

11. The capacitive touch display device as claimed in claim 10, wherein the first sensing unit and the second sensing unit are disposed in adjacent rows of the pixel units.

12. The capacitive touch display device as claimed in claim 1, wherein each touch sensing unit comprises a first sensing module and a second sensing module, the first sensing module and the second sensing module respectively comprises a red pixel unit, a green pixel unit, and a blue pixel unit, the touch sensing element and the coupling sensing element are respectively disposed in two of the red pixel unit, the green pixel unit and the blue pixel unit of the first sensing module, the touch sensing element and the coupling sensing element are directly connected to the same scan lines and are electrically connected to the signal processing circuit through the different touch sensing lines.

13. A capacitive touch panel, comprising:
a plurality of scan lines and a plurality of touch sensing units, and each touch sensing unit comprising:
a plurality of pixel units comprising a thin film transistor and a pixel electrode, wherein the gate of each thin film transistor is directly connected to the corresponding scan lines, and the drain of each thin film transistor is directly connected to each pixel electrode;
a touch sensing element directly connected to the corresponding scan line, the touch sensing element is positioned in a corresponding pixel unit, the touch sensing element providing a touch signal to a signal processing circuit through a touch sensing line when the touch sensing unit operated, wherein the touch signal comprises a scanning signal, a real-touch signal, and an interference signal; and
a coupling sensing element directly connected to the corresponding scan line, the coupling sensing element is positioned in a corresponding pixel unit, the coupling sensing element due to coupling effect of parasitic elements, the coupling sensing element providing a coupling signal to the signal processing circuit through a touch sensing line, and the coupling signal comprises a scanning signal and an interference signal, wherein the signal processing circuit eliminates the coupling signal from the touch signal to filter the interference signal of the touch signal;
a color filter substrate further comprising a common electrode layer, wherein the coupling sensing element comprises an electrode and a switch unit, the switch unit comprises a control end connected to the electrode, and the common electrode layer cannot directly touch and connect the electrode and switch unit when the coupling sensing element is operated.

14. The capacitive touch panel as claimed in claim 13, further comprising a plurality of scan lines, the touch sensing element comprising a touch electrode and a switch element, the switch element comprising a control end and connected between the corresponding scan lines and the touch sensing lines, the touch electrode connected to the control end of the switch element.

15. The capacitive touch panel as claimed in claim 14, wherein the capacitive touch panel further comprises a color filter substrate, a thin film transistor substrate, and a common electrode layer, the touch sensing element further comprises a protrusion, the protrusion is positioned on the color filter substrate and is covered by the common electrode layer, the touch electrode and the switch element are positioned on the thin film transistor substrate and correspond to the protrusion, and the protrusion is operated to make the common electrode layer contact with the touch electrode, the switch element is switched on.

16. The capacitive touch panel as claimed in claim 15, wherein the coupling sensing element comprises an electrode and a switch unit, the switch unit comprises a control end connected to the electrode, and the common electrode layer can not directly touch and connect the electrode and switch unit when the coupling sensing element operated.

17. A capacitive touch display device, comprising:
a capacitive touch panel comprising:
a first base board comprising a common electrode layer;
a second base board;
a plurality of pixel electrodes;

a plurality of thin film transistors, wherein the gate of each thin film transistor is directly connected to the corresponding scan lines, and the drain of each thin film transistor is directly connected to each pixel electrode;

a plurality of scan lines; and a plurality of touch sensing units, and each touch sensing unit comprising:

a touch sensing element directly connected to the corresponding scan line, the touch sensing element is providing a touch signal, wherein the touch signal comprises a scanning signal, a real-touch signal, and an interference signal, and the touch sensing element comprising a switch element positioned on the second base board and a protrusion positioned on the first base board and covered by the common electrode layer, and the protrusion operated to make the common electrode layer contact with the second base board to switch on the switch unit to output the touch signal; and a coupling sensing element due to coupling effect of parasitic elements, the coupling sensing element is directly connected to the corresponding scan line, the coupling sensing element providing a coupling signal, wherein the coupling signal comprises a scanning signal and an interference signal, and the coupling sensing element comprising a switch unit positioned on the second base board, the common electrode layer failing to directly touch the switch unit when the coupling sensing element operated; and a signal processing circuit directly connected to the touch sensing element and the coupling sensing element through at least one touch sensing line, wherein the signal processing circuit receives the touch signal and the coupling signal and eliminates the coupling signal from the touch signal to filter the interference signal of the touch signal.

18. The capacitive touch display device as claimed in claim 17, wherein the touch sensing element further comprises a touch electrode positioned on the second base board, the switch element comprises a control end connected to the touch electrode, the protrusion is operated to make the common electrode layer contact with the touch electrode to switch on the switch element.

19. The capacitive touch display device as claimed in claim 18, wherein the coupling sensing element comprises an electrode positioned on the second base board, and the electrode is connected to one end of the switch unit of the coupling sensing element.

* * * * *